United States Patent [19]

Vermersch

[11] Patent Number: 5,010,273
[45] Date of Patent: Apr. 23, 1991

[54] AGILE MAGNETRON WITH TUNING MOTOR WITH IMPROVED COOLING

[75] Inventor: Alain Vermersch, Velizy, France

[73] Assignee: Thomson-CSF, Puteaux, France

[21] Appl. No.: 377,092

[22] Filed: Jul. 7, 1989

[30] Foreign Application Priority Data

Jul. 8, 1988 [FR] France .................. 88 09308

[51] Int. Cl.$^5$ ............................................ H01J 25/50
[52] U.S. Cl. .............................. 315/39.61; 315/39.55
[58] Field of Search .............. 315/39.51, 39.59, 39.55, 315/39.61; 333/232, 233, 229, 234; 331/86, 90

[56] References Cited

U.S. PATENT DOCUMENTS

| | | | |
|---|---|---|---|
| 3,297,909 | 1/1967 | Foreman et al. | 315/39.61 |
| 3,599,035 | 8/1971 | Frerichs et al. | 315/39.59 |
| 4,410,833 | 10/1983 | Ganguly et al. | 315/39.51 |
| 4,527,094 | 7/1985 | Gerard et al. | 315/39.59 X |

FOREIGN PATENT DOCUMENTS

| | | |
|---|---|---|
| 0239333 | 9/1987 | European Pat. Off. . |
| 0293616 | 9/1915 | Fed. Rep. of Germany . |
| 1050910 | 1/1954 | France . |
| 1088857 | 3/1955 | France . |

Primary Examiner—Eugene R. LaRoche
Assistant Examiner—Seung Ham
Attorney, Agent, or Firm—Oblon, Spivak, McClelland, Maier & Neustadt

[57] ABSTRACT

The disclosure concerns the cooling of frequency tuning motors of agile magnetrons. These motors dissipate a fairly high level of power in a small volume, for they have great winding lengths, the coil being relatively fine to reduce the weight. It is proposed, herein, to fill the very narrow gap in which the coil moves with a gas having high thermal conductivity (such as helium or hydrogen). The gas then forms a thermal shunt between the coil and the pole pieces. The latter are capable of absorbing the heat which is thus transmitted to them.

6 Claims, 1 Drawing Sheet

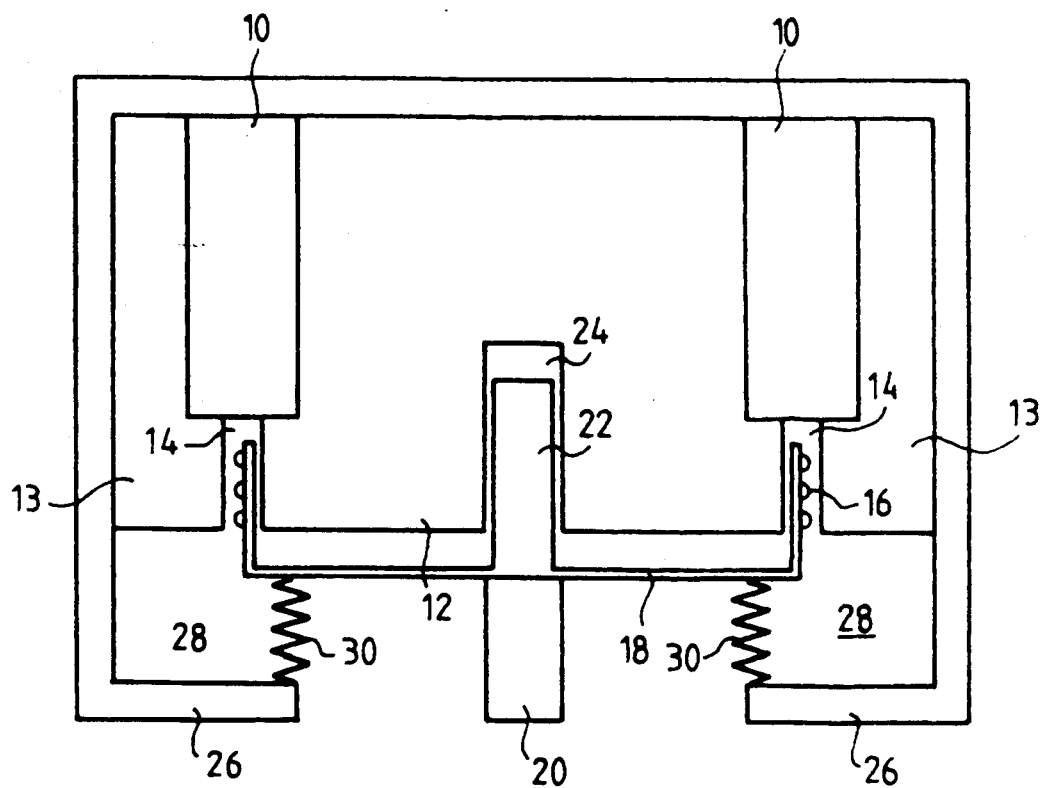

AGILE MAGNETRON WITH TUNING MOTOR WITH IMPROVED COOLING

BACKGROUND OF THE INVENTION

1. Field of the Invention

The invention concerns magnetrons and, more particularly, agile magnetrons; namely magnetrons whose frequency can be tuned very rapidly.

Magnetrons such as this are generally made according to two types of techniques.

In the first technique, a system of fins is made to rotate at the end of the microwave circuit of the magnetron, and the presence of this system of fins modifies the tuning frequency. The frequency of the magnetron then varies according to the periodicity, which may or may not be regular, of passage of the fins driven by a rotating motor. These magnetrons are called "spin-tuned magnetrons".

In the second technique, the tuning is modified by a piston that moves linearly in a tuning cavity. The system is moved by a linear motor formed like a loudspeaker coil. These magnetrons are called "voice-coil magnetrons". A coil through which a variable current flows is placed in the gap of a magnet producing a field that is radial with respect to the coil.

In these two techniques, the (linear or rotary) motor has windings through which relatively high currents flow. These windings get heated up and the motor is cooled by thermal conduction through the mechanical supports and by thermal convection through the atmosphere surrounding the windings of the motor.

To resolve the problem of heat dissipation, it has been sought to optimize parameters such as the number of turns of the windings and the section of the wires forming the windings.

To obtain the benefit of high agility with respect to frequency, a low mass of windings must be used. This enables reducing the kinetic energy of the movable unit, hence the power needed to move it.

It is, therefore, necessary to reduce the length of the winding turns and/or their section, i.e. three parameters can be brought into play: the number of turns, the section of the winding and the diameter of the turns. However, if the number of turns is reduced, the electromagnetic force exerted on the winding is reduced. If the diameter of the turns is reduced, the same thing happens. And if the section of the wires of the winding is reduced, the electrical resistance of the winding is increased, hence the quantity of heat is increased.

There are, therefore, severe limits as regards the possibilities of choosing the number of turns, the section of the wires and the diameter, and it is seen that, to obtain a truly agile magnetron, there has to be a motor dissipating a high quantity of heat in a small volume.

Typical values computed are, for example, a diameter of 48 mm., resistance of 0.02 ohms, current density of 30 amperes per square millimeter of conductor section, heat dissipation of 50 watts, a coil area of about 15 square centimeters to dissipate the power and, consequently, a density of power to be removed of the order of 3 watts per square centimeter of the external surface of the coil.

SUMMARY OF THE INVENTION

The invention brings into play the fact that the winding of the motor is very close to the pole pieces (with a spacing of less than about 1 millimeter) so that heat can be transmitted through this space preponderantly by thermal conduction if it is filled with a gas, whereas heat would be transmitted preponderantly by convection if the thickness were to be notably greater.

This is why, according to the invention, it is proposed to fill the space in which the windings move with a gas having high thermal conductivity, such as hydrogen or helium.

The term "high thermal conductivity" refers herein to thermal conductivity equal to several times that of air, preferably at least three to four times that of air. For example, helium has thermal conductivity of about six times that of air, and hydrogen about seven times that of air.

The cooling thus obtained by thermal conduction through a very thin gaseous strip, preferably thinner than one millimeter, between the heat-dissipating winding and the pole pieces of the motor, acting as a heat sink, may be far more efficient. It is estimated that, when there is air, a difference in temperature of several hundred degrees would be obtained between the windings and the cold wall of the pole pieces, whereas it should be possible to descend, under the same conditions, to below 100 degrees with helium and even further below with hydrogen.

The thin gaseous strip in the gap acts as a very efficient thermal shunt between the winding (heat source) and the pole pieces (heat sink).

Preferably, the gas is enclosed in a gas-tight chamber. The pressure of this gas may be the atmospheric pressure, but the discharge of heat is further improved if the pressure is greater. Therefore, preferably, a pressure of the order of one to three times atmospheric pressure will be chosen.

BRIEF DESCRIPTION OF THE DRAWING

The single FIGURE shows the general structure of a linear motor of an agile magnetron according to the invention.

DESCRIPTION OF A PREFERRED EMBODIMENT

The invention is described and shown in detail with respect to a linear type motor of the voice-coil type for it is here that it finds its most valuable application.

The motor according to the invention has a magnet or a set of magnets 10 producing a radial field with respect to the axis of the coil, which is a vertical axis in the figure.

The field of the magnet is closed radially through two pole pieces 12 and 13 that define a narrow cylindrical gap 14 between them. The coil 16 forming the active element of the motor is a cylindrical coil that can move vertically in this gap.

The coil 16 forms part of a moving element 18 consisting, firstly, of a support for the coil and, secondly, a piston 20 which drives a tuning element of the magnetron. This tuning element is not shown. It may be formed by the end of the piston or by any other element driven by the piston.

The moving element can move only axially for the motion is guided by a shaft 22 solidly joined to the moving element, the shaft 22 penetrating an axial bore 24 of one of the pole pieces.

A gas-tight chamber 26 surrounds the zone in which the coil 16 can move, i.e. namely the gap 14.

This chamber is filled with a gas 28 with high thermal conductivity, preferably hydrogen or helium, the thermal conductivity of which is slightly lower but less dangerous.

The chamber is preferably closed and hermetically sealed, although it is possible to conceive of embodiments wherein there is a flow of the gas 28 having high thermal conductivity. The pressure in the chamber is either atmospheric pressure or, as stated above, a higher pressure, for example between one and three times the atmospheric pressure.

The chamber 26 is closed, for example, by means of a flexible membrane 30 fixed, firstly, to the wall of the chamber and, secondly, to the moving element 18.

To obtain the maximum benefit from the advantages of the invention, the interval between the coil 16 and the pole parts which act as a cold wall for it, and which are directly facing it, must be as small as possible, and preferably smaller than 1 millimeter (for example, 0.5 millimeters).

It is under these conditions that thermal conduction becomes preponderant over convection and that, therefore, efficient use is made of the fact that a gas with high thermal conductivity has been placed in the gap 14.

What is claimed is:

1. A frequency tuning motor for an agile magnetron, said motor having a coil that moves in a very narrow gap facing a pole piece wherein, in order to improve the cooling of the motor, the space between the coil and the pole piece is filled with a gas having high thermal conductivity.

2. A motor according to claim 1, comprising an enclosed chamber surrounding the gap and containing the gas with high thermal conductivity.

3. A motor according to claim 2, wherein the gas is at a pressure of one to three times the atmosphere pressure.

4. A motor according to claim 1, possessing a linear motor formed by a cylindrical coil moving axially in a cylindrical gap.

5. A motor according to claim 1, wherein said gas is hydrogen.

6. A motor according to claim 1, wherein said gas is helium.

* * * * *